(12) United States Patent
Bernard

(10) Patent No.: US 7,784,622 B2
(45) Date of Patent: Aug. 31, 2010

(54) BICYCLE RACK

(76) Inventor: Walter Bernard, 4800 S. Lake Park Ave., Unit 204, Chicago, IL (US) 60615

( * ) Notice: Subject to any disclaimer, the term of this patent is extended or adjusted under 35 U.S.C. 154(b) by 799 days.

(21) Appl. No.: 11/388,494

(22) Filed: Mar. 24, 2006

(65) Prior Publication Data
US 2007/0221589 A1 Sep. 27, 2007

(51) Int. Cl.
A47F 7/00 (2006.01)

(52) U.S. Cl. .......................... 211/20; 211/5

(58) Field of Classification Search ............ 211/5, 211/20, 22, 23, 24, 17, 21; 70/235, 233; 248/552; 224/310, 509, 924, 319; 16/239, 16/361, 357; 414/430, 537, 921
See application file for complete search history.

(56) References Cited

U.S. PATENT DOCUMENTS

| | | | | | |
|---|---|---|---|---|---|
| 458,974 | A | * | 9/1891 | Merrill | 211/20 |
| 565,058 | A | * | 8/1896 | Westphal | 70/234 |
| 605,628 | A | * | 6/1898 | Bradley | 211/5 |
| 639,991 | A | * | 12/1899 | Jewell | 410/3 |
| 703,280 | A | * | 6/1902 | Knoche | 211/20 |
| D36,091 | S | * | 9/1902 | Merritt | D12/115 |
| 853,310 | A | * | 5/1907 | Lockwood | 248/552 |
| 1,920,568 | A | * | 8/1933 | Kling | 16/361 |
| 2,717,084 | A | * | 9/1955 | Groenendal | 211/20 |
| 3,116,836 | A | * | 1/1964 | McCauley | 211/21 |
| 3,458,073 | A | * | 7/1969 | Dawson | 414/462 |
| 3,529,737 | A | * | 9/1970 | Daugherty | 414/462 |
| 3,581,962 | A | * | 6/1971 | Osborn | 224/319 |
| 3,586,188 | A | * | 6/1971 | Cambell | 414/462 |
| 3,603,459 | A | * | 9/1971 | Erb | 211/20 |
| 3,655,082 | A | * | 4/1972 | Garrett | 414/462 |
| 3,770,133 | A | * | 11/1973 | Kolker | 211/19 |
| 3,822,898 | A | * | 7/1974 | Brownlie | 280/402 |
| 3,828,936 | A | * | 8/1974 | Hoenig | 211/19 |
| 3,832,871 | A | * | 9/1974 | Kaufmann | 70/227 |
| 3,861,533 | A | * | 1/1975 | Radek | 211/20 |
| 3,865,244 | A | * | 2/1975 | Galen et al. | 211/5 |
| 3,883,002 | A | * | 5/1975 | Moore | 211/18 |
| 3,912,139 | A | * | 10/1975 | Bowman | 410/3 |
| 3,994,425 | A | * | 11/1976 | Graber | 224/324 |
| 4,015,718 | A | * | 4/1977 | Bernard | 211/5 |
| 4,068,856 | A | * | 1/1978 | Harris | 411/400 |
| 4,126,228 | A | * | 11/1978 | Bala et al. | 211/5 |
| 4,306,660 | A | * | 12/1981 | Livingston | 211/20 |
| 4,316,544 | A | * | 2/1982 | Goldstein | 211/5 |
| 4,345,705 | A | * | 8/1982 | Graber | 224/324 |
| 4,352,363 | A | * | 10/1982 | Wilson | 135/96 |
| 4,352,432 | A | * | 10/1982 | Smith | 211/19 |
| 4,392,572 | A | | 7/1983 | Bernard | |
| 4,442,961 | A | * | 4/1984 | Bott | 224/570 |
| 4,452,384 | A | * | 6/1984 | Graber | 224/314 |
| 4,524,893 | A | * | 6/1985 | Cole | 224/319 |
| 4,646,952 | A | * | 3/1987 | Timmers | 224/485 |

(Continued)

Primary Examiner—Darnell M Jayne
Assistant Examiner—Stanton L Krycinski
(74) Attorney, Agent, or Firm—Beem Patent Law Firm

(57) ABSTRACT

A bicycle storage rack has at least one bicycle tire receiving channel member which is an elongated channel having a width and a depth, and a channel mounting frame adapted to accommodate a plurality of channel members. A holding arrangement is provided for holding a wheel of a bicycle to a channel at any of a plurality of positions along the length of the channel.

20 Claims, 5 Drawing Sheets

U.S. PATENT DOCUMENTS

| | | | |
|---|---|---|---|
| 4,702,401 A * | 10/1987 | Graber et al. ............... 224/536 |
| 4,733,810 A * | 3/1988 | Graber et al. ............... 224/329 |
| 5,228,712 A * | 7/1993 | Speier ........................ 280/401 |
| 5,292,009 A * | 3/1994 | Smith .......................... 211/20 |
| 5,421,495 A * | 6/1995 | Bubik et al. ................ 224/310 |
| 5,449,074 A * | 9/1995 | Paulson et al. ................ 211/24 |
| 5,456,396 A * | 10/1995 | Allen ......................... 224/321 |
| 5,462,398 A * | 10/1995 | Hymer ....................... 414/462 |
| 5,497,927 A * | 3/1996 | Peterson .................... 224/519 |
| 5,560,526 A * | 10/1996 | Jantzen et al. ............. 224/571 |
| 5,607,064 A * | 3/1997 | Fourel ........................... 211/5 |
| 5,690,259 A * | 11/1997 | Montani .................... 224/310 |
| 5,743,411 A * | 4/1998 | Hawkes ....................... 211/20 |
| 5,749,474 A * | 5/1998 | Woodcock .................... 211/18 |
| 5,762,248 A * | 6/1998 | Englander et al. ........... 224/324 |
| 5,820,002 A * | 10/1998 | Allen ......................... 224/324 |
| 5,833,074 A * | 11/1998 | Phillips ....................... 211/21 |
| 5,917,407 A | 6/1999 | Squire |
| 5,941,397 A * | 8/1999 | Buchanan et al. ............. 211/19 |
| 5,984,111 A * | 11/1999 | Pennella ........................ 211/5 |
| 5,988,403 A * | 11/1999 | Robideau ..................... 211/20 |
| 5,996,870 A * | 12/1999 | Shaver ....................... 224/532 |
| 6,053,336 A * | 4/2000 | Reeves ........................ 211/20 |
| 6,296,162 B1 * | 10/2001 | Englander et al. ........... 224/324 |
| 6,336,562 B1 * | 1/2002 | Mori ........................... 211/20 |
| 6,401,299 B1 * | 6/2002 | Schwarz ..................... 16/335 |
| 6,439,397 B1 * | 8/2002 | Reeves ........................ 211/17 |
| 6,460,743 B2 * | 10/2002 | Edgerly et al. .............. 224/324 |
| 6,637,602 B2 * | 10/2003 | Dueck ........................ 211/17 |
| 7,472,517 B2 * | 1/2009 | Blume ........................ 52/79.1 |
| 7,694,830 B1 * | 4/2010 | Larson ........................ 211/20 |
| 2002/0125279 A1 * | 9/2002 | Edgerly et al. .............. 224/310 |
| 2005/0262909 A1 * | 12/2005 | Brooks ........................ 70/227 |
| 2006/0029483 A1 * | 2/2006 | Allen et al. ................... 410/30 |

* cited by examiner

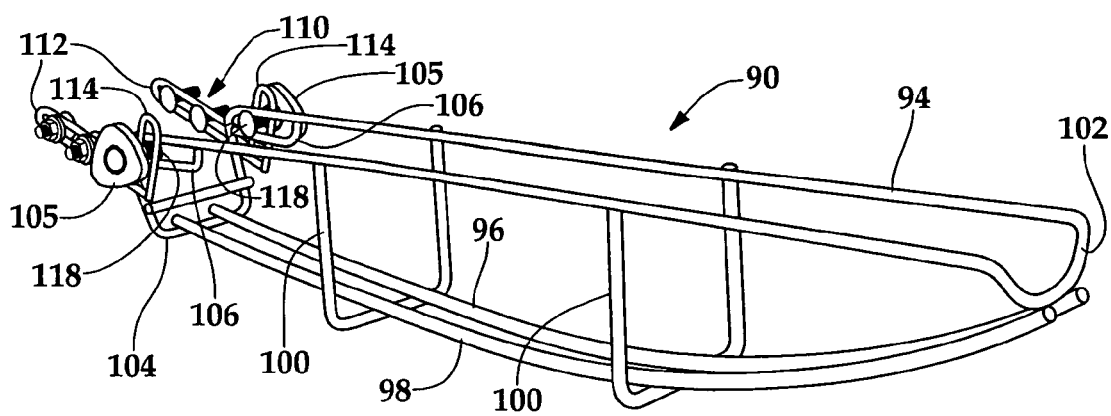
Fig.4A
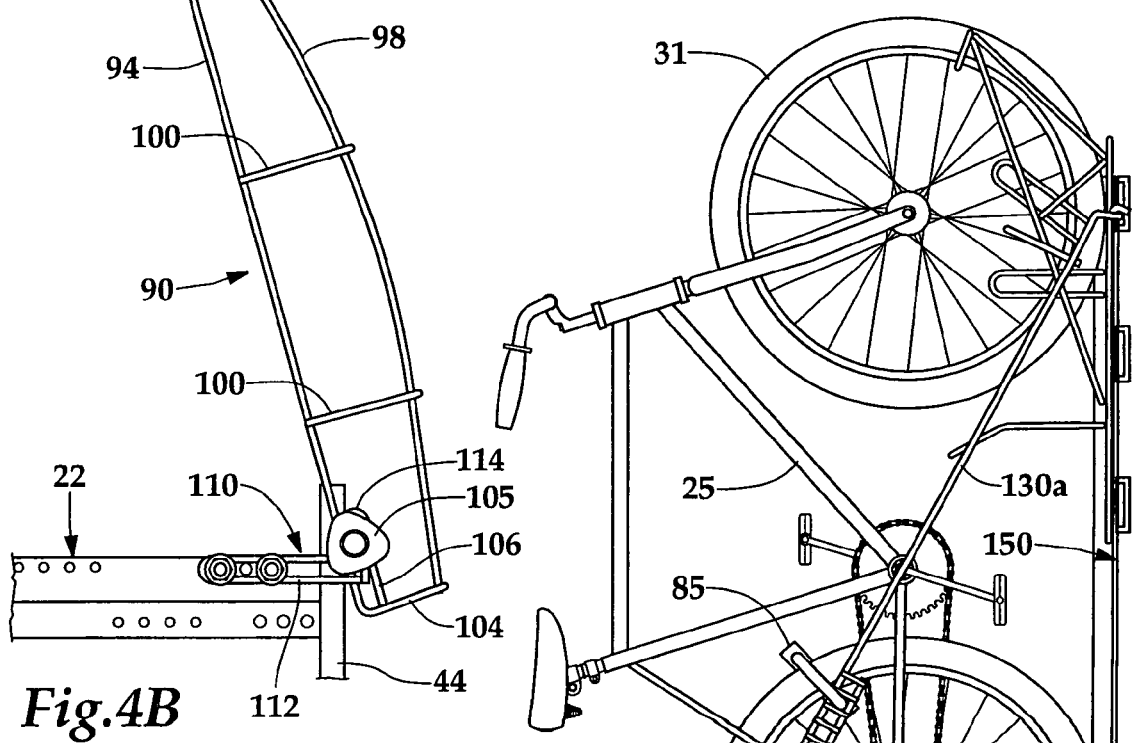
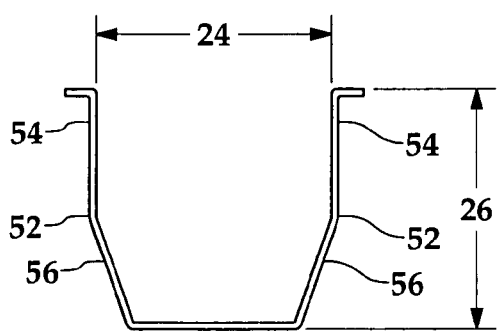
Fig.4B
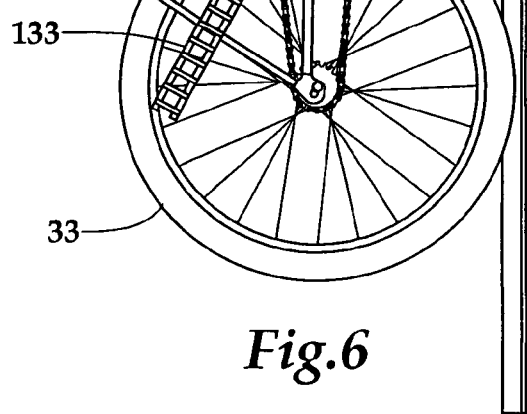
Fig.5
Fig.6

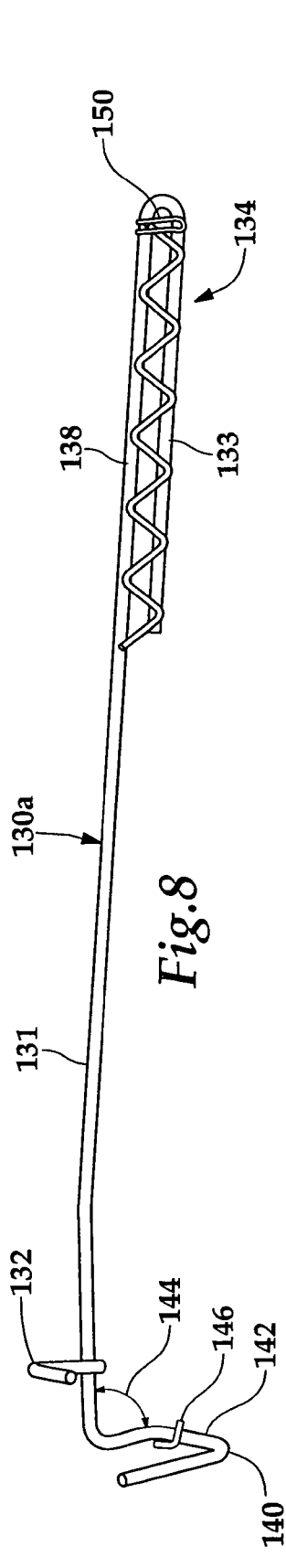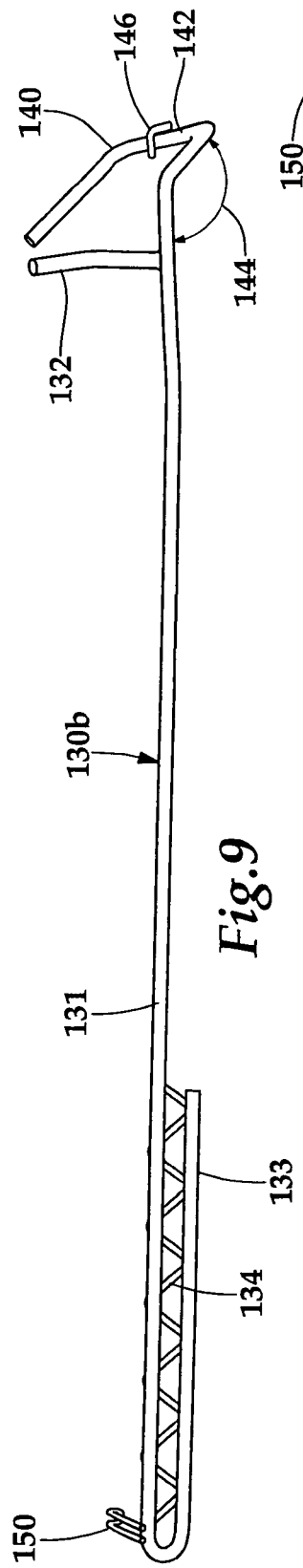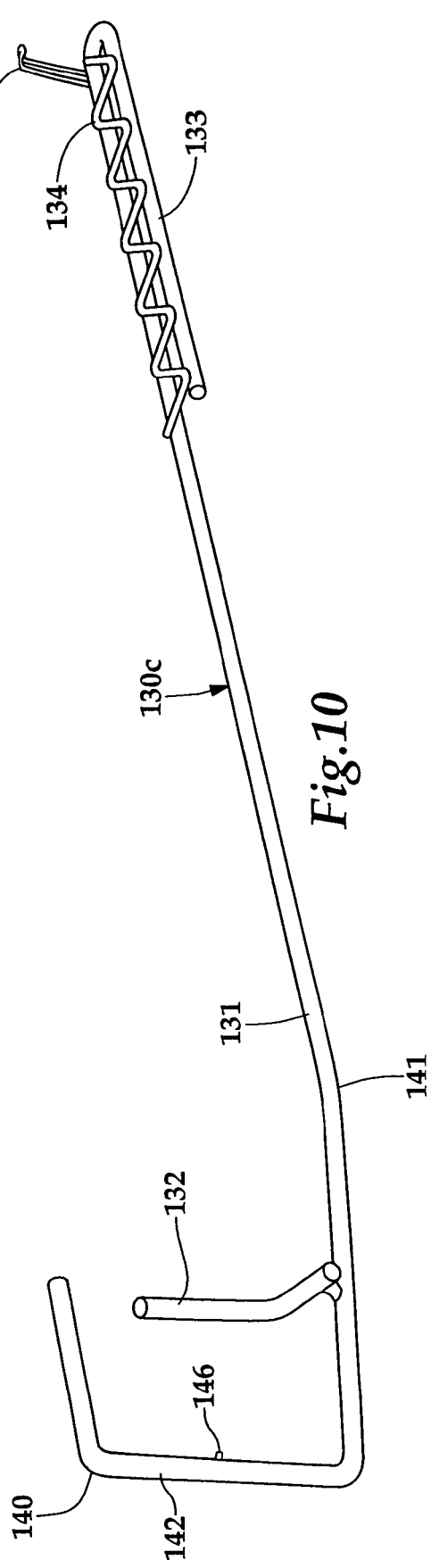

BICYCLE RACK

BACKGROUND OF THE INVENTION

1. Field of the Invention

This invention relates generally to a rack for storing articles, and more particularly, to a novel, modular rack for storing bicycles.

2. Description of the Related Art

Racks for storing bicycles are well known. Many of these racks support the bicycles generally on horizontal surfaces which may or may not form parts of the racks. Although most of the prior art racks are concerned with the storage of bicycles on a substantially horizontal surface, some racks have also been manufactured for storing bicycles suspended from a vertical wall. For example, my prior U.S. Pat. No. 4,392,572 describes a bicycle holder, wherein the bicycle is supported by or from a vertical wall, with a novel attachment between the bicycle and the vertical wall.

My prior bicycle racks have been highly successful in use. These racks provided storage for multiple bicycles in a modular form, in vertical and in horizontal configurations. My prior horizontal bicycle racks utilize a trough-like member for holding the wheels of a bicycle, and having a series of through openings for receiving either a bolt for providing a selectively locatable wheel stop, as well as a series of larger openings for receiving a U-shaped bicycle lock in one of a plurality of positions relative to the rack. However, there is room for further improvement.

BRIEF SUMMARY OF THE INVENTION

Accordingly, it is an object of the invention to provide a new and improved rack for storing bicycles, which uses a relatively small variety of relatively easy to fabricate parts and is highly reliable in use.

Another object of the invention is to provide a rack for supporting the bicycle off the floor.

A still further object of the invention is to provide a rack which is adapted to support bicycles of different sizes and dimensions.

According to the present invention, there is provided, a bicycle storage rack comprising at least one bicycle tire receiving channel member comprising an elongated channel having a width and a depth, a channel mounting frame adapted to accommodate a plurality of channel members, and holding means for holding a wheel of said bicycle to said channel at any of a plurality of positions along the length of said channel.

These and other features and advantages are evident from the following description of the present invention, with reference to the accompanying drawings.

BRIEF DESCRIPTION OF THE SEVERAL VIEWS OF THE DRAWINGS

FIG. 4A is a perspective view illustrating a lowered position of a wheel-engaging ramp-like structure, which may optionally be provided on the bicycle rack of the invention.

FIG. 4B is a side view illustrating a raised position of the wheel-engaging ramp-like structure.

FIG. 5 is a sectional view of a channel member of the bicycle rack of FIGS. 1 and 2.

FIG. 6 is a front view of a vertical bicycle rack, with which an optional locking bar may be used.

FIG. 8 is a side view of an optional locking bar for use with the bicycle racks of any of the preceding Figures.

FIG. 9 is side view of another form of an optional locking bar.

FIG. 10 is a side view of another form of an optional locking bar.

DETAILED DESCRIPTION OF THE ILLUSTRATED EMBODIMENT

Figure 1:
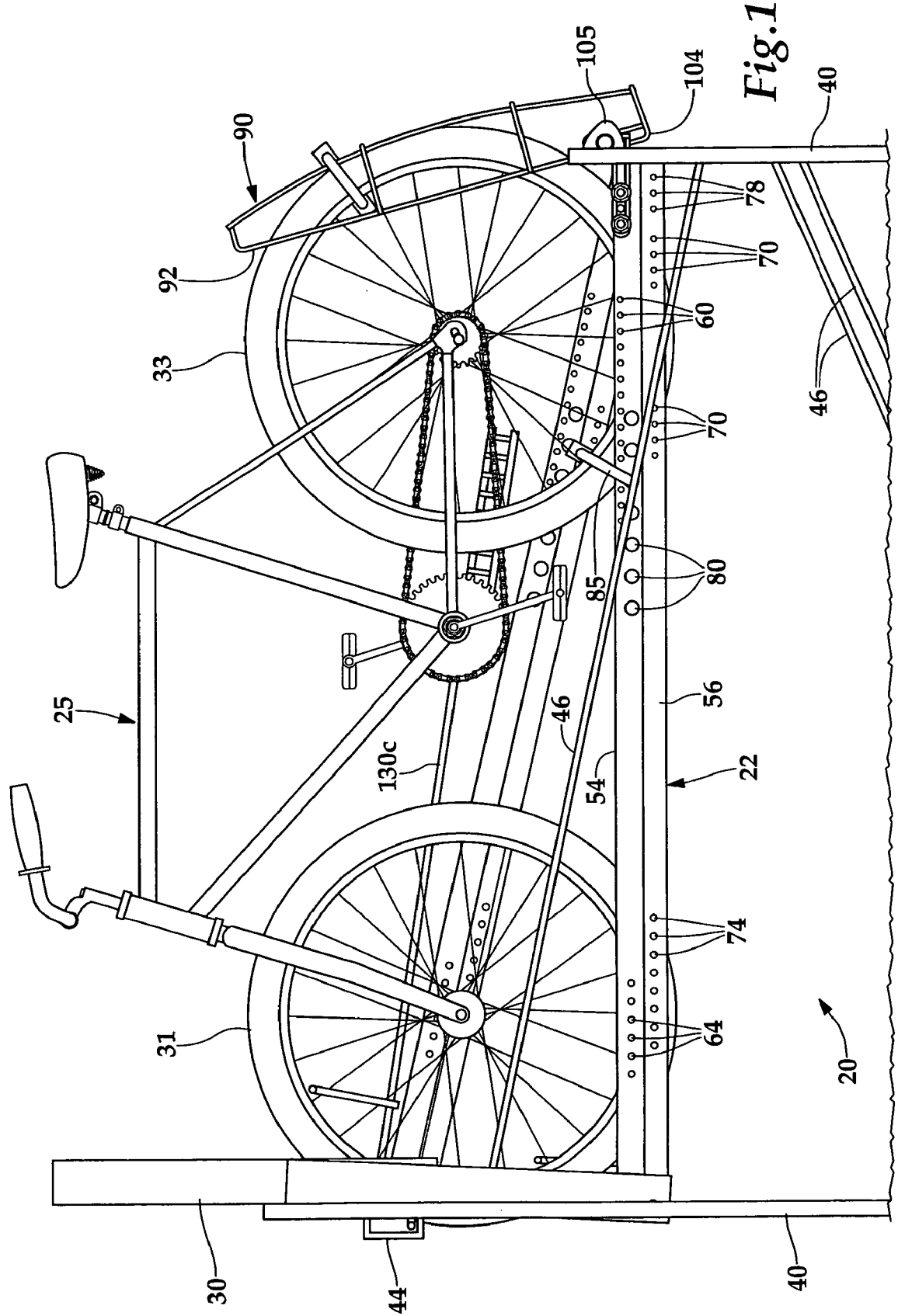
FIG. 1 is a side view of the bicycle storage rack.
Figure 2:
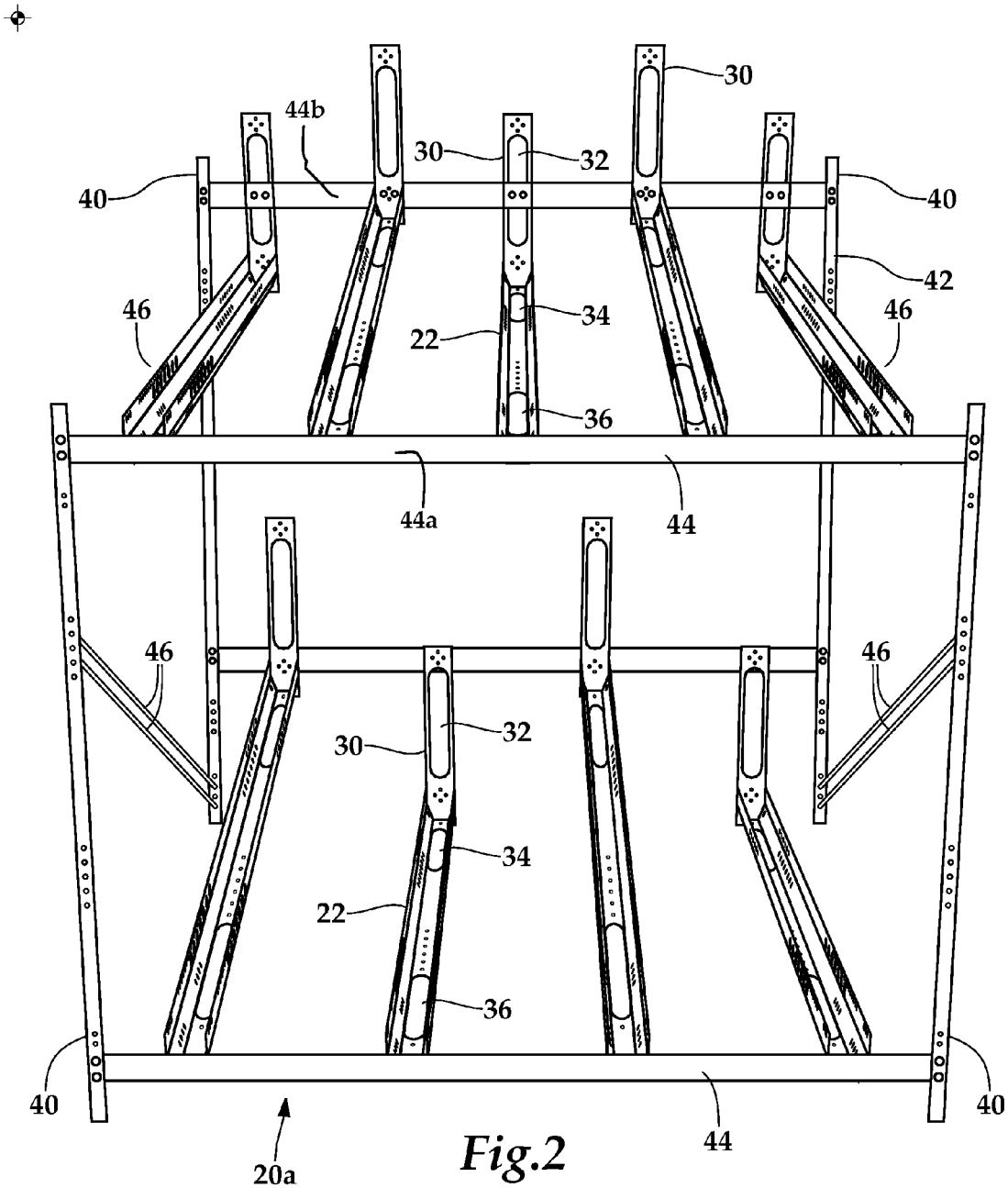
FIG. 2 is a front view of the rack shown in FIG. 1.
Figure 7:
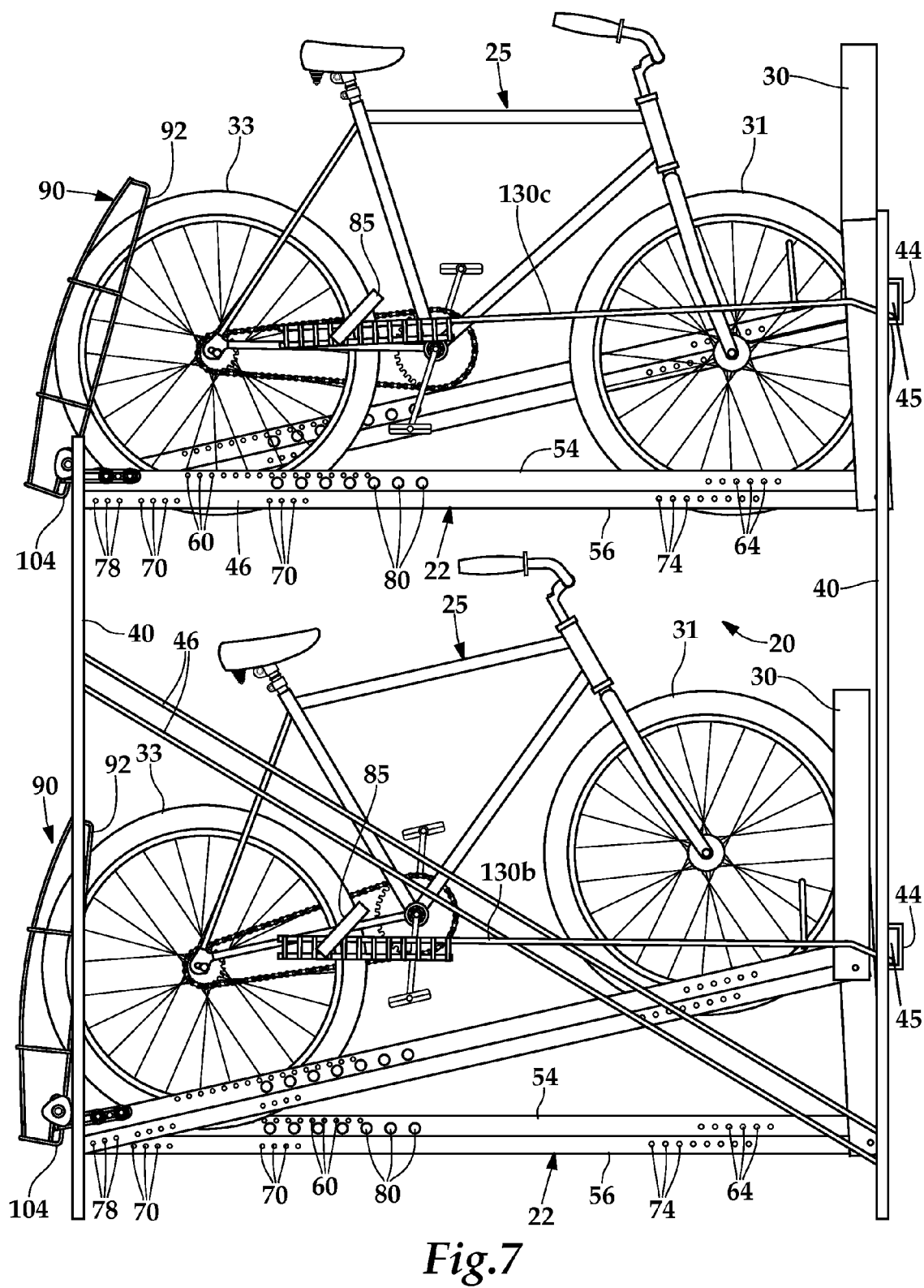
FIG. 7 is a side view of a modular bicycle rack having upper and lower racks for supporting a plurality of bicycles of varying dimensions.

Referring now to FIGS. 1, 2 and 7, a storage rack for storing a bicycle 25 is designated generally by the reference 20. In the illustrated embodiment, the storage rack is generally of a modular form. Generally speaking, the storage rack 20 includes at least one bicycle tire-receiving channel member 22 comprising an elongated generally U-shaped channel (see also FIG. 5) having a width 24 and a depth 26 suitable for accommodating bicycle tires, 31, 33. An upright member or channel 30 is also provided couple to one end of the channel 22 for accommodating one of the tires of the bicycle.

As best viewed in FIG. 2, each channel 22 and upright 30 also includes elongated cutout portion 32, 34, 36 for accommodating a portion of a bicycle tire therethrough, thereby holding the bicycle 25 in place with respect to each channel 22 and its corresponding upright 30. In the embodiment illustrated FIG. 2, a modular bicycle rack 20a is illustrated, comprising a plurality of channels 22 and corresponding uprights 30. In the embodiment shown, the rack 20a is configured for mounting a total of nine bicycles, four on a lower frame portion and five on an upper frame portion, with the channels 22 of the lower frame portion being spaced apart so as to be located generally intermediate projections of the channels 22 of the upper rack portion. In this regard, a frame 40 comprising a plurality of frame members is configured for mounting a plurality of the channels 22 and corresponding uprights 30 in a parallel side-by-side arrangement. The frame 40 generally includes four upright members 42, four horizontal members 44 and two cross brace members 46 at either side thereof. In the illustrated embodiment, the cross braces 46 are parallel and run on a diagonal across the frame. This is done to avoid interference with the handlebars of a bicycle 25 to be placed in one of the outer channels of the lower rack portion in an orientation similar to that of the bicycle 25 shown in FIG. 1. Also shown in FIG. 1 are three alternative positions to utilize a bicycle lock 85 to lock the bicycle to the rack.

In the illustrated embodiment, it will be seen that the channels 22 of the upper and lower rack portions alternate between substantially horizontally oriented channels and channels which are oriented at an incline. This further aids in providing clearance between handlebars, pedals, and the like of adjacent bicycles stored in each of the channels 22 of the upper and lower rack portions.

Channels

Referring also to FIG. 5, the channel 22 comprises an elongated trough-like member having a proximal end and a distal end, a bottom surface 50 and a pair of opposing side surfaces 52 extending upwardly from said bottom surface and extending substantially entire length thereof. The side surfaces 50 include upper surfaces 54, which are parallel and spaced apart and lower surfaces 56, which converge somewhat between the ends of the upper surfaces 54 and the bottom surface 50.

Wheel Holding Structure

In one embodiment, novel holding means are provided for holding at least one of the wheels 31, 33 of the bicycle 25 to the channel 22 at any of a plurality of positions along the length of the channel. The holding means comprise a plurality of pairs of spaced apart aligned through apertures 60 in the respective upper side surfaces 54 and are linearly arrayed extending inwardly generally from one end of channel 22, and at least one pin (not shown) receivable through a selected pair of the through apertures 60 for engaging one wheel 33 of the bicycle 25 and fixing it to the channel 22. This arrangement provides a further mechanical means for holding the bicycle 25 in place on the channel 22. A further plurality of pairs of spaced apart aligned through apertures 78 are for storing the pins.

Wheel Height Adjustment

One embodiment of the bicycle rack 20 also includes wheel height adjustment means for holding a wheel of a bicycle 25 at any of a plurality of heights relative to the channel 22, while still permitting the use of a pin (not shown) to engage and fix the wheel 33 to the channel 22. These height adjustment means comprise a plurality of pairs of spaced apart aligned through apertures 70 in the respective lower side surfaces 56 and are linearly arrayed extending inwardly generally from one end of the channel 22, and at least one pin (not shown) receivable through a selected pair of the through apertures 70 for engaging one wheel 33 of the bicycle 25. Further sets of pairs of spaced apart aligned through apertures 64, 74 in the respective side surfaces 54, 56 are linearly arrayed extending inwardly generally from the other end of channel 22. At least one pin is receivable through a selected pair of each of these sets of through apertures 64, 74 for engaging the other wheel 31 of the bicycle 25. This arrangement permits adjustment of the height of the bicycle 25 relative to the channel 22. The apertures 60, 64, 70 and 74 and corresponding pins may be about one quarter inch in diameter.

Locking Position Adjustment

The channel 22 further includes lock receiving means for mounting a lock for securing a wheel of said bicycle at any of a plurality of positions along the length of said channel. As shown in FIG. 1, the lock receiving means comprises a plurality of pairs of spaced apart aligned through apertures 80 in the respective upper side surfaces 54 of the channel 22. The openings 80 are sized for receiving one arm of a generally U-shaped bicycle lock 85 therethrough, and positioned for permitting engagement of a second arm of the bicycle lock 85 with one wheel 33 of a bicycle 25 at any one of a plurality of positions along the length of the channel 22.

Ramps

Referring to FIGS. 1, 4A and 4B, an assist ramp 90 for the upper rack portion has one end rotatably attached to one end of the channel 22 and is rotatable between a first position (FIG. 4A) extending generally axially outwardly from said end of the channel 22 and a second position (FIGS. 1 and 4B) extending generally at a right angle upwardly from the channel 22. When in the first position, the ramp 90 assists in directing the front wheel of a bicycle onto a channel 22. When in the second position, the ramp 90 embraces a portion of a rear tire, to assist in maintaining the bicycle in place on a channel 22. The ramp 90 is further rotatable, when no bicycle is on the channel 22, between the second position and a third position generally parallel to the channel 22 and about 180 degrees (about 196 degrees in the illustrated embodiment) rotated from the first position.

The ramp 90 is constructed of a plurality of interconnected generally cylindrical rods 92, 94, 96 and 98. These rods include a pair of parallel spaced apart, and generally straight elongated rod members 92, 94 of a length of between about 1½ feet and about 2 feet, and spaced apart by about the same spacing is the opposite walls 54 of the channel 22. A pair of generally parallel curved elongated rods 96, 98 extend over a linear distance about equal to the length of the straight rods 92, 94. A plurality of generally U-shaped rod members 100 interconnect the straight rod members 92, 94 and the curved rod members 96, 98.

In the illustrated embodiment, the generally straight rod members 92, 94 extend as one end into an upwardly turned arcuately curved end portion 102 to which corresponding ends of the curved rod members 96, 98 are joined. At their opposite ends, the rod members 92 and 94 bend at about a 90 degree angle to a U-shaped end portion 104 to which opposite ends of the curved rod members 96, 98 attach.

Hinge Structure

A novel hinge structure is provided for facilitating the above-described rotation of the ramp 90 relative to the channel 22. This hinge arrangement includes a relatively short elongated slot 106 formed at one corner on either side of the ramp 90, for example by welding or otherwise affixing a short generally L-shaped short rod member to the rods 92 and 94 at this location. A pair of generally L-shaped slotted members 110, which may be formed from relatively short, curved rod pieces, are bolted or otherwise affixed to an end of the channel 22. The hinge members 110 form a first generally horizontally oriented elongated slot 112 and a second generally vertically oriented slot 114 attached to an outer end thereof. The slot 114 will be seen to project beyond the outer end of the ramp 22 and corresponding front frame member 44.

A hinge pin takes the form of an elongated bolt 118 which extends through and joins the respective slots 112 and 114. The bolt 118 may be loosened somewhat to permit the above-described rotation of the ramp 90 and tightened somewhat to help in retaining the ramp in place in one of the above-noted positions. In this regard, the lengths of the slots 114 and 106 are selected to permit the ramp to descend a short distance in the vertical downward direction (as viewed in FIG. 1) as it rotates into the position shown in FIG. 1. In this position, the lower end part 104 of the rack will be seen to engage with and stop against the frame member 40 and/or 44 in the event of counter-rotation thereof, thus limiting counter-rotation of the ramp from this position.

In the illustrated embodiment, a pair of knobs 105 are engaged with the head of the bolt 118, and with a complimentary nut (not shown) on the other end thereof. These knobs 105 may be used for manually tightening and loosening the bolt 118 so as to maintain the ramp 90 in the position shown in FIG. 1, for example, engaging the rear wheel of the bicycle. Moreover, with the ramp 90 in this position, an additional bicycle lock such as the lock 85 may be utilized to further lock the bicycle in position relative to the ramp 90 and the channel 22.

Alternative Front Crossbar

Figure 3:
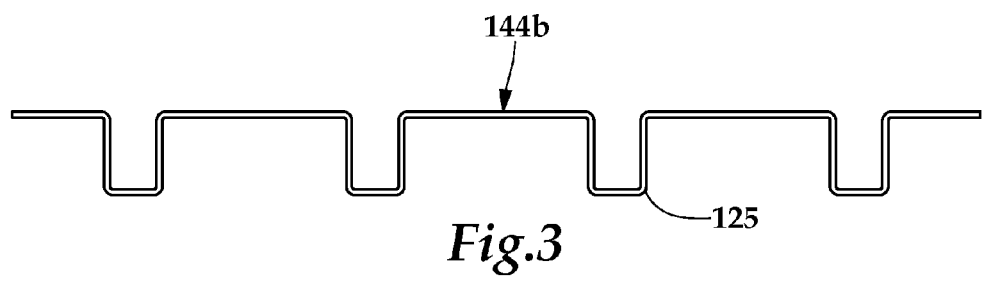
FIG. 3 is a front view of alternate form of a front crossbar for the rack of FIG. 2.

Referring now to FIG. 3, the upper level of said frame includes a front crossbar and 44a and a rear crossbar 44b. In the alternate form of crossbar shown in FIG. 3, the rear crossbar 44b, which is attached to a corresponding end of each of the channels 22 is replaced with a crossbar 144b which is shaped with a plurality of spaced, and downwardly depending, U-shaped portions 125, each for complementarily receiving a corresponding end of one of the channels.

Locking Arms

Referring now to FIGS. 6-10, in one embodiment, an elongated locking arm 130*a*, 130*b* or 130*c* is pivotally mounted to the frame adjacent a front end of at least one of the channels 22. Generally speaking, the locking arm 132 is formed of an elongated rod member similar the rods which form the ramp 90, but of larger diameter. The locking arm 130*a*, 130*b* or 130*c* has a first engagement portion 132 for engaging and holding a front wheel 31 of a bicycle received in the channel 22 and a second engagement portion 134 at its opposite end for receiving and aligning a bicycle lock for engagement with a rear wheel of a bicycle 25 received in the channel 22. Moreover, an additional bicycle lock may be utilized to further lock the front wheel 31 to the locking arm 130*c* as shown in FIG. 1.

FIG. 6 shows a vertical hanging bicycle rack of the type shown in my prior U.S. Pat. No. 4,392,572, for storing bicycles suspended from a vertical wall.

The first engagement portion 132 comprises a generally L-shaped rod member attached to the elongated rod 130*a*, 130*b* or 130*c* near one end thereof. The second engagement portion 134 is configured for receiving a bicycle lock for locking said rear wheel of said bicycle at any one of a plurality of positions along the length of the channel 22. In this regard, and referring to FIGS. 8-10, the engagement portion 134 may include an end 133 of the elongated rod member of 130*a*, 130*b* or 130*c* bent back upon itself and interconnected by a zig-zag shaped length of smaller diameter rod stock 138 to form a plurality of through apertures for receiving the bicycle lock in one of a plurality of positions along the length thereof. An alternative arrangement is shown in FIG. 7, wherein the interconnecting members are a plurality of short straight rod segments which extend straight across the two segments of the elongated rod member 130*b*, to form a ladder-like arrangement. One of these positions may be selected to properly align the lock 85 with a rear wheel 33 of a bicycle 25 as shown, for example, in FIGS. 6 and 7.

The locking arms include a generally U-shaped bent-over end portion 140 for rotatably engaging within the channel-like opening 45 provided by cross-members 44 as best viewed in FIG. 7. The length of an outer end segment 142 of the end portions 140 as sufficiently to permit sliding motion of the locking arm within the channel 45 formed by the cross-member 44 to permit engagement and disengagement of the L-shaped member 132 with a wheel 31 of a bicycle 25, without disengaging the locking arm from its rotatable mounting with cross-member 44. Along end segment 142 is an L-shaped stop member 146 to prevent end segment 142, when locking arm is locked onto the bicycle at its opposite end, from disengagement by horizontal sliding relative to the channel 45 of the cross-member 44.

As indicated in FIGS. 8, 9 and 10, the angle of the end section or portion 140 with respect to the central straight portion 131 of the elongated locking arm 130 differs somewhat, depending on whether the locking arm is to be used with the horizontal channel or inclined channel, as shown in FIG. 7, or the vertical hanging bicycle rack 150 as shown in FIG. 6. In this regard, the locking rod 138 of FIG. 8, in order to properly engage with the vertical hanging bicycle rack of FIG. 6 has an approximately 85 degree bend as indicated by reference numeral 144. Similarly, the locking rod 130*b* of FIG. 9 is intended for use with the inclined channel 33 and has an angle 144 of approximately 160 degrees. The locking arm 130*c* of FIG. 10 is intended for use with the horizontal channel 22 has no angle separating the end part 140 from the straight section 131. However, in each of the locking arms in FIGS. 8-10, the substantially straight section 131 may have a slight bend, as indicated by reference 141, shortly ahead of the L-shaped wheel-engaging member 132. Finally, in the illustrated embodiment, each locking arm 130 has relatively short L-shaped member 150 near its bent over end, just ahead of the bend which defines the segment 133. This L-shaped part 150 may be used to engage a portion of the bicycle frame to hold the end of the locking arm in place preparatory to attaching a lock, which would incorporate both bicycle wheels and frame.

Although the various rod members described herein are made from a round stock, it is apparent that other structural members having different cross-sectional shapes can be utilized.

From the foregoing description, it will be apparent to one skilled in the art what particular advantages have been obtained with this novel bicycle rack. This bicycle rack has been particularly designed for use in apartment buildings and condominiums or any place where storage space is at a premium.

The bicycle rack is simply constructed of members which, are readily bolted or otherwise joined together and form an inexpensive rack for supporting one or more bicycles.

It should be understood that the foregoing description relates to only a preferred embodiment of the invention, and that numerous modifications or alterations may be made therein without departing from the spirit and scope of the invention as set forth in the appended claims.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A storage rack for storing a bicycle, said storage rack comprising:
   at least one bicycle tire receiving channel member comprising an elongated channel having a width and a depth;
   a channel mounting frame adapted to accommodate a plurality of channel members in a parallel side-by-side arrangement,
   holding means for holding a wheel of said bicycle to said channel at any of a plurality of positions along the length of said channel;
   a wheel embracing ramp having one end rotatably attached to one end of said channel; and
   a hinge arrangement for rotatably coupling said ramp to said channel, comprising an elongated slot formed at one corner on either side of the ramp, a pair of generally L-shaped slotted members affixed to an end of the channel, and an elongated hinge pin extending through and joining the respective slots and slotted members;
   wherein said hinge arrangement permits both rotational and translational movement of said ramp with respect to said channel.

2. A storage rack according to claim 1, further including wheel height adjustment means for holding a wheel of said bicycle at any of a plurality of heights relative to said channel depth.

3. A storage rack according to claim 1, said channel further including lock receiving means for mounting a lock for securing a wheel of said bicycle at any of a plurality of positions along the length of said channel.

4. A storage rack according to claim 1, wherein said ramp is rotatable between a first position extending generally axially outwardly from said end of said channel and a second position extending generally at a right angle upwardly from said channel.

5. A storage rack according to claim 4, wherein said wheel embracing ramp is further rotatable between said second position and a third position generally parallel to said channel and about 180 degrees rotated from said first position.

6. A storage rack according to claim 1, wherein said frame mounts two side-by-side channels, one of said channels being substantially horizontal and the other of said channels being inclined at an angle.

7. A storage rack according to claim 1, wherein said frame has an upper level and a lower level, and wherein each of said upper and said lower level mounts two side-by-side channels, one of said channels being substantially horizontal and the other of said channels being inclined at an angle.

8. A storage rack according to claim 7, wherein said upper level of said frame includes a front crossbar and a rear crossbar, said rear crossbar being attached to a rear end of each of said channels, and being shaped with a plurality of spaced, and downwardly depending, U-shaped portions, each for complementarily receiving said rear end of one of said channels.

9. A storage rack according to claim 7, wherein each of said upper and said lower level mounts more than two side-by-side channels, alternating adjacent ones of said channels being substantially horizontal and inclined at an angle, respectively.

10. A storage rack according to claim 1, and further including an elongated locking arm assembly pivotally mounted to said frame adjacent a front end of at least one of said channels and having a first engagement portion for engaging and holding a front wheel of a bicycle received in said channel and a second engagement portion at a distal end of said locking arm assembly for receiving and aligning a bicycle lock for engagement with a rear wheel of said bicycle received in said channel.

11. A storage rack according to claim 10, wherein said second engagement portion is configured for receiving said bicycle lock for holding said rear wheel of said bicycle at any one of a plurality of positions along the length of said channel.

12. A storage rack according to claim 1, wherein said channel comprises an elongated trough-like member having a proximal end and a distal end, bottom surface and a pair of opposing side surfaces extending upwardly from said bottom surface and extending substantially in tire length thereof, and wherein said holding means comprises a plurality of pairs of spaced apart aligned through apertures in the respective sides of said trough and extending generally from said distal end thereof, and at least one pin receivable through a selected pair of said through apertures for engaging one wheel of said bicycle.

13. A storage rack according to claim 12, wherein said holding means comprises a second plurality of pairs of spaced apart aligned through apertures in the respective sides of said trough and extending generally from said proximal end thereof, and at least one pin receivable through a selected pair of said through apertures for engaging a second wheel of said bicycle.

14. A storage rack according to claim 2, wherein said channel comprises an elongated trough-like member having a proximal end and a distal end, bottom surface and a pair of opposing side surfaces extending upwardly from said bottom surface and extending substantially in tire length thereof, and wherein said wheel height adjustment means comprises a plurality of pairs of spaced apart aligned through apertures in the respective sides of said trough and extending generally from said distal end thereof, and at least one pin receivable through a selected pair of said through apertures for engaging one wheel of said bicycle.

15. A storage rack according to claim 14, said wheel height adjustment means comprises a second plurality of pairs of spaced apart aligned through apertures in the respective sides of said trough and extending generally from said proximal end thereof, and at least one pin receivable through a selected pair of said through apertures for engaging one wheel of said bicycle.

16. A storage rack according to claim 3, wherein said channel comprises an elongated trough-like member having a proximal end and a distal end, bottom surface and a pair of opposing side surfaces extending upwardly from said bottom surface and extending substantially in tire length thereof, and wherein said lock receiving means comprises a plurality of pairs of spaced apart aligned through apertures in the respective sides of said trough and sized for receiving one arm of a generally U-shaped bicycle lock therethrough, and positioned for permitting engagement of a second arm of said bicycle lock with the wheel of a bicycle at any one of a plurality of position this along the length of said channel.

17. A storage rack according to claim 4, wherein said ramp is constructed of a plurality of interconnected generally cylindrical rods, said rods including a pair of parallel spaced apart, and generally straight elongated rod members in the length of between about 1½ feet and about 2 feet, and spaced apart by about the same spacing as the opposite walls of said channel; a pair of generally parallel curved elongated rods extending over a linear distance about equal to the length of said straight rods, and a plurality of generally U-shaped rod members interconnecting said straight rod members and said curved rod members.

18. A storage rack according to claim 1, wherein each said channel comprises an elongated trough-like member having a proximal end and a distal end, a bottom surface and a pair of opposing side surfaces extending upwardly from said bottom surface and extending substantially entire length thereof, and wherein the side surfaces include upper surfaces, which are parallel and spaced apart, and lower surfaces, which are angled inwardly between the upper surfaces and the bottom surface.

19. A storage rack according to claim 17, and further including an elongated locking arm pivotally mounted to the frame adjacent a front end of at least one of the channels, said locking arm having a first engagement portion for engaging and holding a front wheel of a bicycle received in the channel and a second engagement portion at its opposite end for receiving and aligning a bicycle lock for engagement with a front or rear wheel or a frame of a bicycle received in the channel.

20. A storage rack according to claim 1, further comprising:
a locking arm-receiving channel formed between said frame and at least one upright; and
an elongated locking arm having a generally U-shaped end portion for rotatably engaging said locking arm-receiving channel at one end of said locking arm, said locking arm further having a first engagement portion for engaging and holding a front wheel of a bicycle received in the channel and a second engagement portion at its opposite end for receiving and aligning a bicycle lock for engagement with a rear wheel of said bicycle.

* * * * *